S. F. HOLDER.
SANITARY MILK BUCKET.
APPLICATION FILED DEC. 7, 1917.
1,298,503.
Patented Mar. 25, 1919.
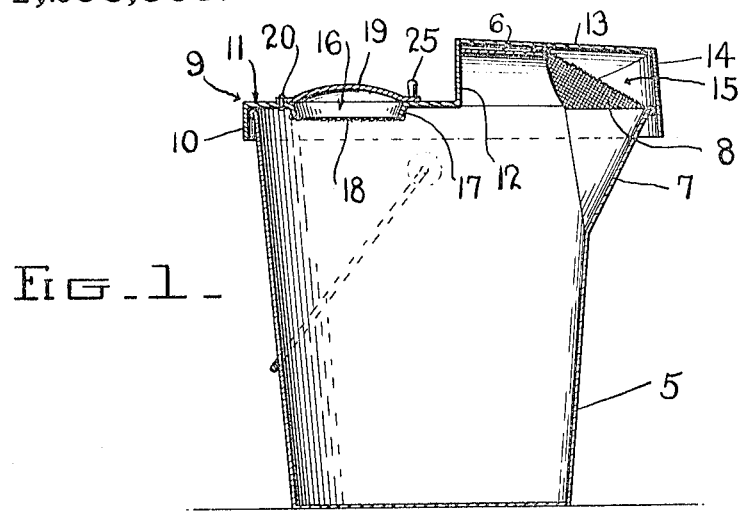
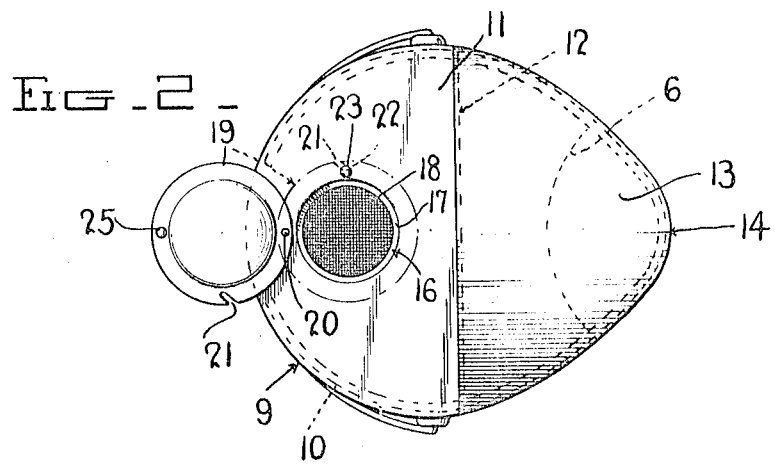
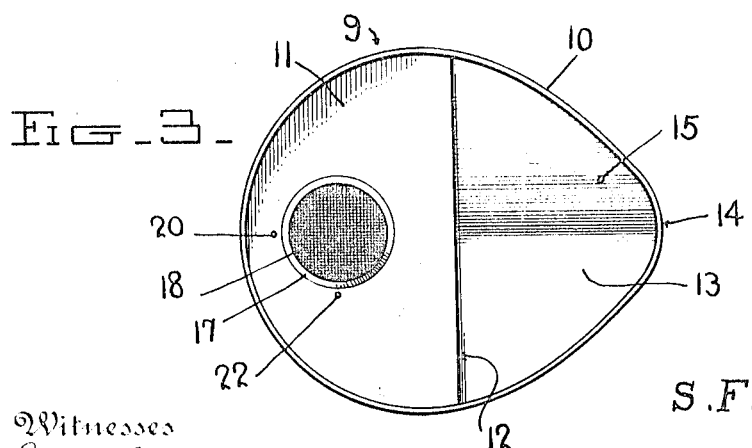
Inventor
S. F. Holder
By Victor J. Evans
Attorney
Witnesses
L. B. James

UNITED STATES PATENT OFFICE.

SHERMAN F. HOLDER, OF DUGGAR, INDIANA.

SANITARY MILK-BUCKET.

1,298,503.  Specification of Letters Patent.  Patented Mar. 25, 1919.

Application filed December 7, 1917. Serial No. 206,087.

*To all whom it may concern:*

Be it known that I, SHERMAN F. HOLDER, a citizen of the United States, residing at Duggar, in the county of Sullivan and State of Indiana, have invented new and useful Improvements in Sanitary Milk-Buckets, of which the following is a specification.

This invention relates to a strainer or cover for milk buckets or pails.

An object of the invention is to produce a device of this class shaped to snugly fit over a milk bucket or pail to accommodate the cowl or crown plate of the pail to effectively prevent the entrance of dust, dirt, or other foreign matter to the pail, the said cover being provided with a normally closed strainer and being designed to be arranged on the bucket during the milking operation, so that the milk will be strained when delivered to the bucket and also strained when poured from the bucket.

A further object of the invention is to produce a sanitary milk bucket strainer which shall be of a simple construction, easily and quickly applied to or removed from a milk pail, and which shall be thoroughly effective for the purpose devised.

In the drawing, accompanying the specification,

Figure 1 is an approximately central vertical longitudinal sectional view through a milk bucket having my improvement arranged thereon.

Fig. 2 is a top plan view of the same, the door for the straining element of the cover being opened.

Fig. 3 is a bottom plan view of the improvement.

Referring now to the drawing in detail, the numeral 5 designates a milk bucket, the same, at its open mouth, being provided with an arched cowl or crown plate 6, the same being disposed adjacent to but away from the pouring spout 7. Between the spout and the cowl 7 is arranged a screen 8 through which the milk passes when being poured from the bucket to strain the said milk.

The improvement contemplates the employment of a removable top or cover 9 for the bucket 5, the same including a continuous flange 10 which is shaped to snugly engage with the wall of the bucket at the top thereof, including the spout 7 of the said bucket. The flange 10, at the front end of the improvement is gradually widened from the sides to the center thereof, and on the flat top 11 of the member 10, at the commencement of the widened portion of the flange is arranged a transverse arched plate 12, a rounded plate 13 being connected at the edge of the said arched plate and to the edge of the widened portion of the flange, the said widened portion being indicated by the numeral 14. This arrangement provides the member 10 with a compartment 15 designed to snugly receive the cowl 6, of the screen or strainer member 8, between the said cowl and the spout of the bucket.

The flat portion or top 11 of the improvement is approximately centrally formed with a round opening 16 which is preferably provided with an inwardly flared flange or wall 17, and to the lower edge of this flange or wall is secured a screen 18. The opening 16 is designed to be closed by a door 19, the same comprising a round metallic member which is pivotally secured, as at 20, to the top 11, and, of course, to one side of the opening 16. The plate has one of its edges provided with an angularly disposed slot 21, which is designed to receive the shank 22 of a headed member 23, the said member being secured to the top 11. The door member 19 may be, and preferably is, dished, so that the same is substantially concavo-convex in cross section and the said plate, being constructed of metal embodying natural resiliency, will, when the head 23 of the shank 24 is arranged over the said plate, be forced into tight contact with the top 11, thus effectively closing the opening 16 in the top. The door is provided with an operating handle 25, so that the same may be swung to its open position when milk is to be poured through the opening in the bucket and strained by the screen 18.

From the foregoing description, when taken in connection with the accompanying drawing, the simplicity and advantages of the construction will, it is thought, be apparent without further detailed description.

Having thus described the invention, what I claim is:

1. In combination with a milk bucket, having an arched cowl at the mouth thereof opposite the spout of the bucket, and a screen between said cowl and spout, of a member having a continuous flange which frictionally engages with the sides of the bucket at the mouth thereof, said member having a projecting portion providing a pocket for the cowl and spout, the member, to the rear of the pocket having its upper face provided with an opening, an inwardly extending flange surrounding the opening, a screen secured to said flange, a pivoted door for closing the opening and comprising a resilient element having one of its edges notched, and a member comprising a shank and a head, the shank of which being designed to receive the opening and the head of which being designed to frictionally contact with the door when the door is swung to its closed position.

2. In combination with a milk pail, having a spout at its mouth at one of the sides thereof, and an arched cowl at its said mouth opposite the said spout, of a cover for the pail, comprising a flanged member conforming to the shape of the pail including the spout thereof, and frictionally engaging therewith, said cover having a transverse arched outstanding plate at approximately the center thereof designed to contact with the inner end of the cowl, a rounded plate secured on the edge of the outstanding plate and to the flange of the cover and overlying the cowl and the spout, said cover having its lower and straight face provided with an opening and an inwardly flared flange surrounding the opening, a pivoted member normally closing the opening, and latching means between said cover and said member.

In testimony whereof I affix my signature.

SHERMAN F. HOLDER.